(12) United States Patent
Scott

(10) Patent No.: US 9,422,823 B2
(45) Date of Patent: Aug. 23, 2016

(54) PISTON SEAL RING

(75) Inventor: Kevin Scott, Branston (GB)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 469 days.

(21) Appl. No.: 14/117,068

(22) PCT Filed: Apr. 27, 2012

(86) PCT No.: PCT/EP2012/057838
§ 371 (c)(1),
(2), (4) Date: Nov. 12, 2013

(87) PCT Pub. No.: WO2012/163611
PCT Pub. Date: Dec. 6, 2012

(65) Prior Publication Data
US 2014/0341731 A1    Nov. 20, 2014

(30) Foreign Application Priority Data
May 30, 2011    (EP) ..................... 11168119

(51) Int. Cl.
*F01D 11/00* (2006.01)
*F01D 25/26* (2006.01)
*B23P 19/00* (2006.01)
*F01D 11/24* (2006.01)

(52) U.S. Cl.
CPC .............. *F01D 11/005* (2013.01); *B23P 19/00* (2013.01); *F01D 11/003* (2013.01); *F01D 11/24* (2013.01); *F01D 25/26* (2013.01); *F05D 2220/32* (2013.01); *Y10T 29/49323* (2015.01)

(58) Field of Classification Search
CPC ....... F01D 11/003; F01D 11/24; F01D 25/26; F01D 11/005; F01D 2220/32; B23P 19/00; Y10T 29/49323
See application file for complete search history.

(56) References Cited

U.S. PATENT DOCUMENTS

| 3,689,174 A | 9/1972 | Mierley, Sr. |
| 3,781,125 A * | 12/1973 | Rahaim ................... F01D 9/042 415/115 |
| 3,841,787 A | 10/1974 | Scalzo |
| 4,245,951 A | 1/1981 | Minnich |

(Continued)

FOREIGN PATENT DOCUMENTS

| CN | 101372923 A | 2/2009 |
| DE | 274476 C | 12/1989 |

(Continued)

*Primary Examiner* — Igor Kershteyn
(74) *Attorney, Agent, or Firm* — Beusse Wolter Sanks & Maire

(57) ABSTRACT

A gas turbine having a device and a further device is provided. The device includes an outer casing, an inner casing and a seal ring. The outer casing and the inner casing are arranged in such a way that a cooling duct is formed between each other. The seal ring is arranged between the outer casing and the inner casing in such a way that the seal ring seals the cooling duct from an environment surrounding the outer casing. The device and the further device are mounted together such that working fluid is flowable from the further device to the device. Furthermore the device includes a rotatable shaft and the further device includes a further rotatable shaft, wherein the rotatable shaft and the further rotatable shaft are mechanically decoupled from each other, and wherein the seal ring exclusively abuts against the inner casing and against the outer casing of the device.

7 Claims, 3 Drawing Sheets

(56) References Cited

U.S. PATENT DOCUMENTS

| | | |
|---|---|---|
| 4,307,993 A | 12/1981 | Hartel |
| 4,511,306 A * | 4/1985 | Hultgren .................. F01D 9/02 415/136 |
| 4,613,280 A | 9/1986 | Tate |
| 6,769,870 B2 | 8/2004 | De Meo |
| 2005/0242522 A1 | 11/2005 | Lejars |
| 2008/0063514 A1 | 3/2008 | Durocher et al. |
| 2008/0148726 A1 | 6/2008 | Romenesko |
| 2010/0129207 A1 | 5/2010 | Bekyigit et al. |

FOREIGN PATENT DOCUMENTS

| | | |
|---|---|---|
| EP | 0974736 A1 | 1/2000 |
| EP | 1426561 A2 | 6/2004 |
| FR | 2122162 A5 | 8/1972 |
| RU | 2299993 C2 | 5/2007 |

* cited by examiner

PISTON SEAL RING

CROSS REFERENCE TO RELATED APPLICATIONS

This application is the US National Stage of International Application No. PCT/EP2012/057838 filed Apr. 27, 2012, and claims the benefit thereof. The International Application claims the benefit of European Application No. EP 11168119 filed May 30, 2011. All of the applications are incorporated by reference herein in their entirety.

FIELD OF INVENTION

The present invention relates to a device for a gas turbine. Moreover, the present invention relates to a method of manufacturing a device for a gas turbine.

BACKGROUND

Conventional gas turbines comprise an inner casing and an outer casing. In particular, the inner casing separates the working fluid of the turbine from the environment. The inner casing separates in particular the inner volume of the gas turbine from the outer volume of the turbine. To the inner casing, the stator vanes of a turbine section or of a compressor section are mounted. The outer casing surrounds the inner casing, wherein generally between the inner casing and the outer casing a cooling air cavity and a cooling air duct, respectively, is formed.

Leakage of cooling air and of working fluid between the inner and outer casing is needed to be prevented in order to avoid that the cooling air, in particular of the turbine section, escapes. At the same time a simple and reliable assembly of the gas turbine casing parts should be provided.

In conventional gas turbines, along an axial direction of the turbine, a compressor section and a turbine section are mounted together at its axial ends. A seal ring is mounted with one side to an axial end of a turbine section either to the inner casing or to the outer casing and with the other side to an axial end of a compressor section.

FIG. 3 illustrates a conventional gas turbine 300 comprising a conventional power turbine 310 and a conventional gas generator 320 which are mounted together at its axial end. The conventional power turbine 310 comprises an annular conventional outer casing 311 and an annular conventional inner casing 312. The conventional outer casing 311 and the conventional inner casing 312 extend generally annular around a rotating axis 101 of the conventional gas turbine 300. The stator vanes 115 are mounted to the conventional inner casing 312. Between two rows of stator vanes 115, a rotor blade 116 may rotate. Between the conventional outer casing 311 and the conventional inner casing 312, a conventional cooling duct 314 is formed, through which cooling air is flowable. At an axial end of the conventional power turbine 310, a conventional seal ring 313 is attached. The conventional seal ring 313 is mounted to a part of a further conventional outer casing 321 (or a further conventional inner casing 322) of the conventional gas generator 320 and the conventional inner casing 312 of the power turbine 310 for generating a sealing between the conventional inner casing 312 and the further conventional outer casing 321. The conventional seal ring 313 is fixed against axially displacement e.g. by fixation to the conventional inner casing 312 and is in slidable contact with the further conventional outer casing 321, such that thermal expansion in axial direction between the conventional power turbine 310 and the conventional gas generator 320 is provided.

EP 1 426 561 A1 discloses structures for attaching or sealing a space between components having different thermal coefficients or rates of thermal expansion. A sealing element is mounted between a first component and a second component that have different rates or amounts of dimensional change upon being exposed to temperatures other than ambient temperatures. The sealing element comprises a first attachment structure associated with the first component that slidably engages a second attachment structure associated with the second component, thereby allowing for an independent floating movement of the second component relative to the first component. The structure can comprise split rings, laminar rings or multiple split rings.

U.S. Pat. No. 4,613,280 discloses a turbine engine which is constructed to passively modulate the flow of cooling air into the shroud. Seal rings are disposed relative to the cooling air inlets in the shroud such that pressure in temperature variations in the engine will cause the cooling air inlets to be either fully opened completely blocked by the seal ring or modulated therebetween in accordance with the cooling needs of the shroud.

U.S. Pat. No. 4,307,993 discloses an air cooled cylinder with piston ring labyrinths. A turbine cylinder is in contact at its outer surface with split rings which are held in space in annular slots in a cylindrically extending ring holder. The rings, while remaining in contact with the outer surface of the cylinder are allowed to expand and contract within their respective slots.

US 2010/0129207 A1 discloses a steam turbine comprising a rotor and a inner casing, wherein between the inner casing and the rotor a flow passage is formed which on the inlet side is axially delimited by a balance piston which is arranged on a rotor. Moreover, a piston seal is provided between the inner casing and the rotor.

DE 27 44 76 discloses a steam turbine comprising a casing to which a vane carrier is mounted.

In conventional turbine designs, the seal ring, in particular the piston ring, is carried by a part of the gas generator and by another part of the power turbine, so that a sealing arrangement is generated not until the gas generator is fixed to the power turbine. This mounting procedure of the gas generator and the power turbine together causes a blind assembly of the seal ring inside both sections, because during the mounting of the sections, the seal ring is only hardly visible. Moreover, a sealing test of the seal ring in the sealing section is difficult after the mounting of the gas turbine to the gas generator.

SUMMARY OF THE INVENTION

It is an objective of the present invention to provide a proper sealing assembly for a gas turbine.

This objective may be solved by a device for a gas turbine and by a method of manufacturing a device for a gas turbine according to the independent claims.

According to a first aspect of the present invention, the device, such as a power turbine, for a gas turbine is presented. The device comprises an outer casing, an inner casing and a seal ring. The outer casing and the inner casing are arranged in such a way that a cooling duct is formed between each other. The seal ring is arranged between the outer casing and the inner casing in such a way that the seal ring seals the cooling duct from an environment surrounding the outer casing.

In particular, according to a further aspect of the present invention, a gas turbine comprising a device, such as a power turbine, as described above and a further device, such as a gas generator, is presented. The device and the further device are mounted together such that a working fluid, i.e. a working gas, is flowable e.g. from the further device to the device, i.e. for driving the device. The device comprises a rotatable shaft and the further device comprises a further rotatable shaft. The rotatable shaft and the further rotatable shaft are mechanically decoupled from each other. A seal ring exclusively abuts against the inner casing and against the outer casing of the device.

According to a further aspect of the present invention, a method of manufacturing a device for a gas turbine is presented. The method comprises a forming of a cooling duct between an outer casing of the device and an inner casing of the device. A seal is arranged between the outer casing and the inner casing in such a way that the seal ring seals the cooling duct from an environment surrounding the outer casing.

The rotatable shaft of the device rotates around a rotary axis which defines the axial direction of the gas turbine. A direction which directs from the outside in direction to the rotary axis of the turbine shaft and which is perpendicular to the rotary axis denotes the radial direction of a turbine. The rotatable shaft and the further rotatable shaft may be aligned parallel with respect to each other.

The device comprises a variety of casing parts which have the function of supporting functional elements of the turbine and/or which are used for directing fluid streams of the turbine. In particular, the inner casing of the device is adapted for supporting e.g. the stator vanes. Moreover, to the inner casing of the device, a variety of fluid directing parts of the turbine, such as air deflectors, may be attached.

In particular, the inner casing of the device separates the working fluid from the environment. The inner casing separates in particular the inner volume of the device from a volume formed between the inner casing and the outer casing. Inside the inner volume, the working fluid streams along a main fluid direction, wherein the main flow direction is in particular orientated axial with respect to the turbine shaft. Within the context of this application, inside the inner volume of the device, the stator vanes and the rotor blades are installed. In particular, the working fluid flows inside the inner volume along the main flow direction.

A cooling fluid streams inside the volume which surrounds the inner casing and hence the inner volume. The outer casing of the device surrounds, as described above, the inner casing. Between the inner casing and the outer casing the cooling duct is formed. The outer casing may have a cooling fluid inlet hole in order to provide a cooling fluid inlet from the environment into the cooling duct.

The inner casing and the outer casing of the device may have a cone-like converging or diverging shape, wherein the diameter and the size of the inner casing and the outer casing increase or decrease along the main flow direction and the axial direction, respectively. Moreover, the inner casing and/or the outer casing have an annular shape around the shaft and form the annular cooling duct in circumferential direction around the shaft. The inner casing and/or the outer casing may extend along the complete circumference of the device or may be separated along a circumferential direction into several circumferential segments.

In this respect, it is mentioned that the annular cooling duct may be a plenum chamber between the inner casing and the outer casing.

The seal ring is arranged between the outer casing and the inner casing of the device for sealing the cooling duct from an environment surrounding the outer casing. The seal ring may be a piston ring which is separated and divided at one separating section. At the separating section, two end portions of the seal ring may abut with each other. Each end portion may have different corresponding contact surfaces. Moreover, the seal ring may comprise a cross-sectional profile which corresponds to a C-seal profile, E-seal profile, W-seal profile and/or a leaf seal. The seal ring may be a piston ring constructed as a single part with an axial lap joint or with twin rings. The seal ring seals the fluid inside the cooling duct from the air of the environment of the device.

In this respect, it is mentioned that the environment (surroundings) defines the space surrounding the inner casing and the outer casing.

The device within the context of the application differs to the further device in such a way that the device comprises the shaft which is mechanically decoupled with the further shaft of the further device which may be connected to the device. However, the device and the further device may share a common working fluid. For example, the working fluid flowing through the device may exit the device and may further flow through the further device and vice versa.

For example, the device and/or the further device may be a power turbine and/or a gas generator, respectively. Moreover, the device and/or the further device may be a turbine (high pressure turbine HPT, intermediate pressure turbine IPT, low pressure turbine LPT) and/or a compressor (high pressure compressor HPC, intermediate pressure compressor IPC, low pressure compressor LPC) of a jet engine for an aircraft.

The device or the further device may be a gas generator which comprises a compression section, a burner section and a turbine section. The compression section and the turbine section may be mounted to one common shaft, such that the turbine section drives the compression section. Inside the compression section the working fluid is compressed along the main flow direction. The compression section comprises e.g. the inner casing and the outer casing which may have a converging shape, wherein the diameter decrease and the size of the further inner casing and the further outer casing converge along the main flow direction and the axial direction, respectively. Moreover, the gas generator may comprise burner chambers for adding thermal energy to the working fluid. The working fluid is compressed inside the inner volume of the compression section by stator vanes and rotor vanes of the compression section. In the compression section, mechanical work of the rotor blades is converted in fluid energy of the working fluid. Inside the inner volume of the turbine section of the gas generator, the working fluid expands and drives the shaft of the gas generator. In the turbine section of the gas generator, fluid energy of the working fluid is converted in mechanical work by driving the rotor blades. Approximately 50% (percent) of the energy of the working fluid is used for driving the blades in the compressor section of the gas generator.

The device or the further device may also be a power turbine. In the power turbine, a turbine section is installed. In the turbine section of the power turbine, the energy of the working fluid which exits the gas generator is converted in mechanical work for generating e.g. power for external use. Thereby, the working fluid drives the shaft of the power turbine, which shaft is decoupled from the shaft of the gas generator.

By the present invention, the seal ring is exclusively and fully installed within the device of the gas turbine. The device is functionally separated from the further device, i.e. the shaft of the device is mechanically decoupled from the further shaft of the further device. In contrary to previous approaches, where the seal abuts onto both, a part of the further device, such as the gas generator, and a part of the device, such as the power turbine, by the present invention a device, e.g. a power turbine or a gas generator, is presented to which the seal ring is completely and exclusively mounted. Hence, the device may be modularly manufactured, wherein the device comprises a fully sealed cooling duct from the environment. Hence, before the device is mounted to the further device, for example tightness tests and other functional tests of the device may be conducted independently from the further device. The seal ring is inspectable after installation exclusively in the device. In other words, putting the seal entirely in the power turbine structure, i.e. in the device, is a more advantageous way of doing this than putting the seal between the gas generator (i.e. the further device) and the power turbine (i.e. the device).

Moreover, by the present invention, the sealing quality of the cooling duct may be improved by a proper manufacturing and installation of the seal ring such that the leakage of cooling fluid is reduced. Hence, the cooling capacity is improved so that the temperature of the material of the inner casing and outer casing is reduced. Hence, cheaper iron-based material, such that a chrome cast iron material instead of a nickel-based material may be applied due to the lower material temperatures.

According to a further exemplary embodiment, the seal ring is arranged between the outer casing and the inner casing in such a way that the seal ring is partially visible from the environment surrounding the outer casing. Hence, the installation of the seal ring within the device is not covered by further elements. Moreover, the seal may be easier accessible for inspection after installation.

According to a further exemplary embodiment, the seal ring is an in-springing ring which is clamped to the inner casing such that clamping forces of the in-springing ring are transmitted to the inner casing. Hence, by clamping the seal ring to the inner casing, a relative movement, in particular along the axial direction of the shaft of the device, between the outer casing and the seal ring is provided. Hence, thermal expansions may be balanced.

According to a further exemplary embodiment, the seal ring is an out-springing ring which is clamped to the outer casing such that the clamping forces of the out-springing ring are transmitted to the outer casing. Hence, by clamping the seal ring to the outer casing, a relative movement, in particular along the axial direction of the shaft of the device, between the inner casing and the seal ring is provided.

According to a further exemplary embodiment of the gas turbine, the device comprises an inner volume surrounded by the inner casing, wherein a working fluid steams through the inner volume. The further device comprises a further inner casing and a further outer casing. The device (e.g. a power turbine) and the further device are mounted together in such a way that a cavity between the device and the further device is formed. The cavity is surrounded by the inner casing, the further inner casing, the outer casing and the further outer casing, wherein the cavity is coupled and connected to the inner volume. In particular, the cavity is formed at an axial interface between the device and the further device.

By coupling the cavity to the inner volume, through which the working fluid streams, the fluid in the cavity comprises for example similar pressure values, temperature values and/or a similar chemical composition in comparison to the working fluid in the streaming through the inner volume.

Moreover, because the seal ring is exclusively attached to the inner casing and the outer casing of the device and hence not attached to a part of the further device, the axial distance between casing parts of the device and casing parts of the further device may be increased without affecting the location of the seal ring. Hence, the cavity may be enlarged in particular along the axial direction. Hence, by the larger cavity, an easier accessibility into the cavity by measurement devices, such as pressure measurement devices is achieved.

Moreover, because the seal ring is mounted exclusively between the inner casing and the outer casing, the cooling duct is sealed, such that the fluid inside the cavity is not affected by pressure or temperature of the cooling fluid in the cooling duct. Hence, the fluid in the cavity, which is coupled to the working fluid in the inner volume, comprises similar parameters, such that a measurement of the parameters of the fluid in the cavity may be indicative of the parameters of the working fluid inside the inner volume.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
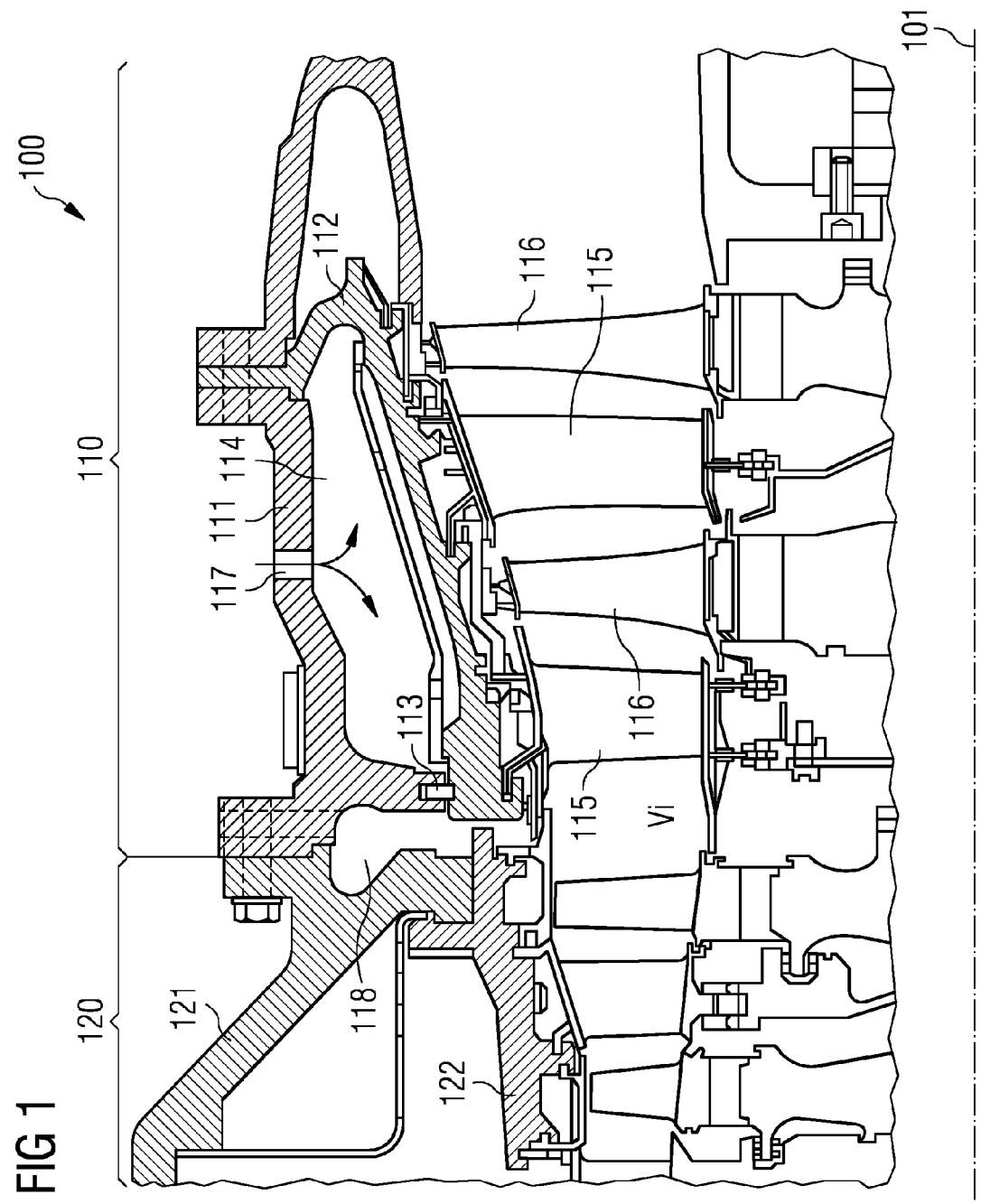
FIG. 1 shows a schematic view of a seal ring installed exclusively to a device, e.g. a power turbine, according to an exemplary embodiment according to the present invention.

The illustrations in the drawings are schematical. It is noted that in different figures, similar or identical elements are provided with the same reference signs.

FIG. 1 shows a gas turbine 100 comprising a device 110 and a further device 120. The parts from the further device 120 are highlighted by the uniform hatching on the left side in FIG. 1.

The parts of the device 110 are shown on the right side of the turbine 100 in FIG. 1. The device 110 comprises an outer casing 111, an inner casing 112 and a seal ring 113. The outer casing 111 and the inner casing 112 are arranged in such a way that a cooling duct 114 is formed between each other. The seal ring 113 is exclusively arranged between the outer casing 111 and the inner casing 112 in such a way that the seal ring 113 seals the cooling duct 114 from an environment surrounding the outer casing 111.

The outer casing 111 and the inner casing 112 may extend in circumferential direction around a rotating axis 101 of the turbine 100. Hence, the cooling duct 114 may as well extend in circumferential direction around the rotating axis 101. At a separation section between the outer casing 111 and the inner casing 112, sealing elements are provided. In particular, at the axial end of the device 110 which faces the further device 120, the seal ring 113 is installed between the outer casing 111 and the inner casing 112. The seal ring 113 is not supported or in contact with parts of the further device 120, such that the device 110 may be manufactured and assembled modularly and independently from the further device 120.

In particular, the gas turbine 100 shown in FIG. 1, the device 110 is a power turbine and the further device 120 is a gas generator, wherein the gas generator generates a working fluid with a high energy level which is required for driving the power turbine. Both devices 110, 120 are coupled at a respective axial end of each other. In particular, the further outer casing 121 of the further device 120 is fixed to the outer casing 111 of the device 110. The further inner casing 122 of the further device 120 is coupled to the inner casing 112 of the device 100 in such a way, that a common inner volume Vi is formed along which the working fluid may flow from the further device 120 to the device 111.

Between the device 110 and the further device 120 the cavity 118 is formed. The cavity 118 is coupled with the inner volume Vi, such that the fluid inside the cavity 118 comprises similar pressure values and temperature values as the working fluid inside the inner volume Vi. Hence, a measured pressure value and temperature value of the fluid inside the cavity 118 may be indicative of the pressure value and the temperature value of the working fluid inside the inner volume Vi. In particular, in the vicinity of the stator vane 115 and the rotor blade 116, the working fluid inside the inner volume has distribution of pressure values, which are caused by e.g. blockage effects generated when flowing against for example the stator vane 115. Inside the cavity 118, the fluid is showing less of a variation from fluid dynamic effects such that a true pressure value is measurable in comparison to a measured pressure value inside the inner volume Vi.

Hence, between the further device 120 (e.g. the gas generator, particularly comprising a compressor turbine) and the device 110 (e.g. the power turbine) the cavity 118 is formed which may form an annular duct around the shaft. The fluid inside the cavity 118 is almost a stationary fluid that averages the variation in pressure which occurs in the main flow stream of the working fluid inside in the inner volume Vi. For example, a pressure of the fluid may be measured when entering the gas generator (further device 120) and the pressure of the working fluid may be measured at the exit of the power turbine (device 110). Additionally, a pressure may be measured inside the cavity 118 which is similar to a pressure of the working fluid at the exit of the gas generator. Hence, by comparing the measured pressure values, an indication of the relative aeroperformance of the gas generator (further device 120) and the power turbine (device 110) is achieved. As described above, this is achieved by a simple pressure tapping in the cavity 118 which is unaffected by turbulences from the rotating blade 116 and the stator vane 115 inside the inner volume Vi.

The device 110 comprises a shaft and the further device 120 comprises a further shaft. The shaft and the further shaft are functionally and mechanically decoupled and independent from each other. Hence, the gas turbine 100 may have a two-shaft engine design. By manufacturing the device 110 independently from the further device 120, the installation location of the seal ring 113 between the inner casing 112 and the outer casing 111 is accessible, such that an easier installation is achieved.

Moreover, as shown in FIG. 1, to the inner casing 112, stator vanes 115 are installed wherein between the rows of stator vanes 115 rotor blades 116 which are mounted to a turbine shaft which may rotate.

Furthermore, the outer casing 111 may comprise a cooling air inlet 117 for providing a transportation of cooling air inside the cooling duct 114 or out of the cooling duct 114.

Figure 2:
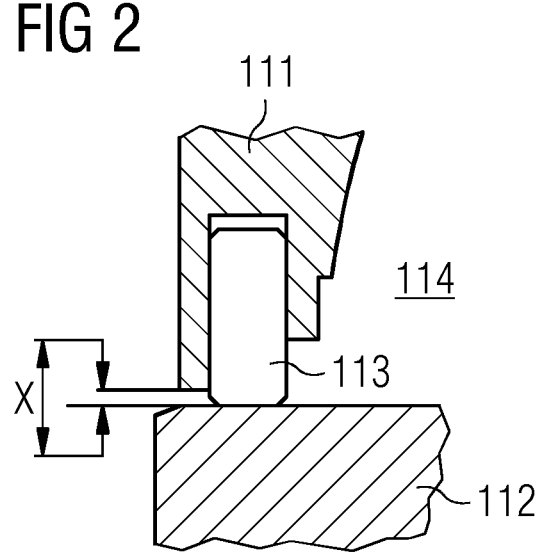
FIG. 2 illustrates a detailed view of an installation of a seal ring exclusively to a device, e.g. a power turbine, according to an exemplary embodiment of the present invention.
Figure 3:
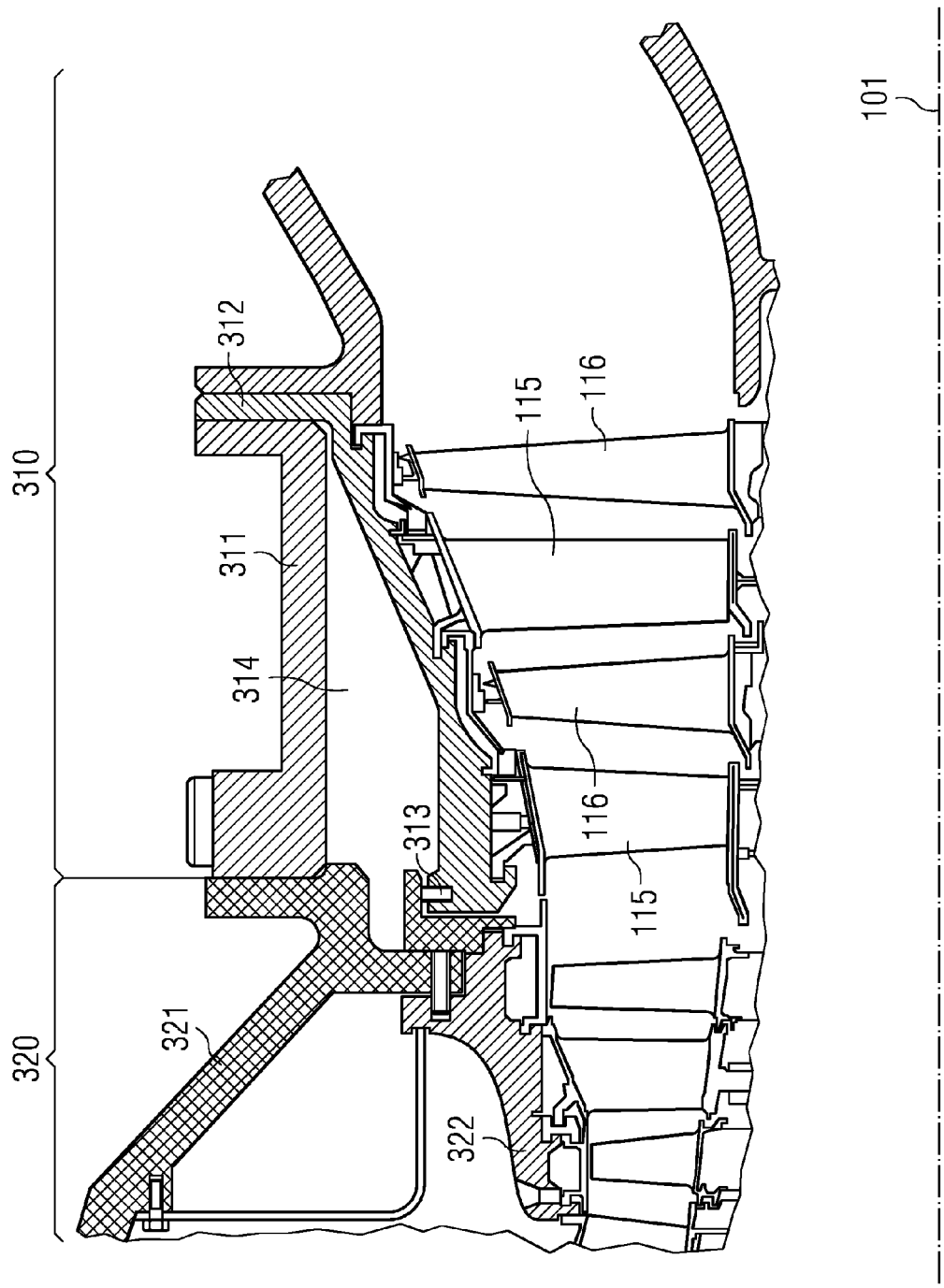
FIG. 3 shows a schematic view of a conventional gas turbine.

FIG. 2 shows a detailed view of the installation location of the seal ring 113 in a device 110. The outer casing 111 may comprise an annular groove, into which the seal ring 113 may be installed. At a radial inner face of the seal ring 113, the seal ring 113 abuts against the surface of the inner casing 112. Hence, the seal ring 113 is attached for sealing the cooling duct 114 from the environment of the outer casing 111.

In the exemplary embodiment shown in FIG. 2, the seal ring 113 is an in-springing ring which is clamped to the inner casing 112. An axial movement of the seal ring 113 for example due to thermal expansion of the inner casing 112 may still be possible. Moreover, a gap between a radial outer face of the seal ring 113 and the outer casing 111 is provided, such that a radial thermal expansion of the inner casing 112 or the outer casing 111 is still possible without pressing the seal ring 113.

Moreover, as shown in FIG. 2, the axial face of the outer casing 111 may comprise a distance x to the inner casing 112, such that the seal ring 113 is visible from the environment of the outer casing 111. Hence, the accessibility of the spring ring 113 is provided and a proper manufacturing and installation of the seal ring 113 is possible.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A gas turbine comprising
a device,
   wherein the device comprises an outer casing, an inner casing and a seal ring,
   wherein the outer casing and the inner casing are arranged in such a way that a cooling duct is formed between each other, and
   wherein the seal ring is arranged between the outer casing and the inner casing in such a way that the seal ring seals the cooling duct from an environment surrounding the outer casing, and
a further device,
   wherein the device and the further device are mounted together such that working fluid is flowable from the further device to the device,
   wherein the device comprises a rotatable shaft and wherein the further device comprises a further rotatable shaft,
   wherein the rotatable shaft and the further rotatable shaft are mechanically decoupled from each other, and
   wherein the seal ring exclusively abuts against the inner casing and against the outer casing of the device.

2. The gas turbine according to claim 1,
wherein the seal ring is arranged between the outer casing and the inner casing in such a way that that the seal ring is partially visible from the environment surrounding the outer casing.

3. The gas turbine according to claim 1,
wherein the seal ring is an in-springing ring which is clamped to the inner casing such that clamping forces of the in-springing ring are transmitted to the inner casing.

4. The gas turbine according to claim 1, wherein the seal ring is an out-springing ring which is clamped to the outer casing such that clamping forces of the out-springing ring are transmitted to the outer casing.

5. The gas turbine according to claim 1, wherein the device comprises a power turbine, and wherein the further device comprises a gas generator.

6. The gas turbine according to claim 1, wherein the device comprises an inner volume (Vi) surrounded by the inner casing, wherein a working fluid steams through the inner volume (Vi),
- wherein the further device comprises a further inner casing and a further outer casing,
- wherein the device and the further device are mounted together in such a way that a cavity between the device and the further device is formed,
- wherein the cavity is surrounded by the inner casing, the further inner casing, the outer casing and the further outer casing,
- wherein the cavity is connected to the inner volume (Vi).

7. A method of manufacturing a device for a gas turbine, the method comprising
- forming a cooling duct between an outer casing of the device and an inner casing of the device,
- arranging a seal ring between the outer casing and the inner casing in such a way that the seal ring seals the cooling duct from an environment surrounding the outer casing,
- mounting the device and a further device together such that working fluid is flowable from the further device to the device,
- wherein the device comprises a rotatable shaft and wherein the further device comprises a further rotatable shaft,
- wherein the rotatable shaft and the further rotatable shaft are mechanically decoupled from each other, and
- wherein the seal ring exclusively abuts against the inner casing and against the outer casing of the device.

\* \* \* \* \*